United States Patent [19]

Seiber

[11] Patent Number: 4,565,411
[45] Date of Patent: Jan. 21, 1986

[54] HYDRAULIC BRAKE SYSTEM WITH SLIP CONTROL

[75] Inventor: Wolfram Seiber, Darmstadt, Fed. Rep. of Germany

[73] Assignee: ITT Industries, Inc., New York, N.Y.

[21] Appl. No.: 629,696

[22] Filed: Jul. 11, 1984

[30] Foreign Application Priority Data

Jul. 29, 1983 [DE] Fed. Rep. of Germany ....... 3327401

[51] Int. Cl.$^4$ ............................................. B60T 8/10
[52] U.S. Cl. ................................. 303/110; 180/197; 303/114
[58] Field of Search .................... 180/197; 303/93, 95, 303/103, 105, 110, 114, 119

[56] References Cited

U.S. PATENT DOCUMENTS 4,416,347 11/1983 Bertling et al. ................. 303/110 X
4,509,802 4/1985 Solleder et al. ..................... 303/110

Primary Examiner—Duane A. Reger
Attorney, Agent, or Firm—James B. Raden; William J. Michals

[57] ABSTRACT

A hydraulic brake system with slip control for automotive vehicles, with a pedal-operable braking pressure generator (1, 2) and with wheel brakes (16, 17, 22, 23) connected to the braking pressure generator, in which brake system between the braking pressure generator (1, 2) and wheel brakes (16, 17, 22, 23) valve means (14, 15, 18, 19, 24, 26) are arranged which are controllable by slip control electronics and by means of which the connections to the wheel brakes (16, 17, 22, 23) may be locked and connections may be established between the wheel brakes (16, 17, 22, 23) and a storage reservoir (21). For control of the acceleration slip by means of the slip control electronics in the brake system wheel brakes (22, 23) associated with the driven wheels communicate with an auxiliary pressure source (6) by way of a normally locking connecting valve (25) controllable by the slip control electronics.

5 Claims, 2 Drawing Figures

HYDRAULIC BRAKE SYSTEM WITH SLIP CONTROL

BACKGROUND OF THE INVENTION

The invention relates to a hydraulic brake system with slip control for automotive vehicles, with a pedal-operable braking pressure generator and with wheel brakes connected at the braking pressure generator, in which brake system between the braking pressure generator and the wheel brakes valve means are arranged which are controllable by slip control electronics and by means of which the connections to the wheel brakes may be locked and connections may be established between the wheel brakes and a storage reservoir.

A device with the above characteristics is described in the German published and printed patent application DE-OS No. 30 40 561.9. The prior art brake system has a brake booster followed by a master cylinder. At the master cylinder first brake circuits are connected which are preferably arranged at the front axle of an automotive vehicle. A second brake circuit is connected at the pressure chamber of the hydraulic power booster. The second brake circuit communicates with wheel brakes arranged at the rear axle of the automotive vehicle.

Electromagnetically operable valve means are connected in the connection between the master cylinder and the wheel brakes arranged at the front axle of the automotive vehicle. The electromagnetically operable valve means may be switched by slip control electronics into a locking position so that the pressure in the wheel brakes connected to the master cylinder may be kept constant independently of the pressure generated in the master cylinder. Further, at the wheel brakes arranged at the front axle, electromagnetically operable valve means are connected which normally are in a locking position and which upon actuation by slip control electronics may be switched into an open position in which pressure medium will be tapped from the wheel brakes, thereby the effective braking pressure being reduced.

In the connection between the pressure chamber of the hydraulic power booster and the rear axle wheel brakes of the automotive vehicle which are connected to the pressure chamber corresponding valve means are also arranged by means of which the pressure maybe kept constant at the wheel brakes associated with the rear axle while, and by means of a suitable switching-over of a solenoid valve a pressure reduction may be brought about.

The slip control electronics, in combination with speed sensors associated with the vehicle wheels, will register critical slip values at the vehicle wheels and release corresponding control signals to the solenoid valves. By a suitable actuation of the electromagnetically operable valves the braking pressure may be kept constant independently of the pressure generated in the braking pressure generator or may be reduced so as to effectively prevent an imminent state of lock-up during a braking action.

It is known that the occurrence of critical slip values is not limited to braking actions alone. It is possible that the driven wheels of the automotive vehicle may reach critical slip values when starting. The result thereof will be that acceleration of the vehicle will not be achieved. Further, in the case of rear-axle-driven automotive vehicles, there exists the danger that, with the rear wheels spinning, the directional stability of the automotive vehicle will be lost which may lead to critical driving situations. This is particular the case on road surfaces with small coefficients of friction.

It is thus an object of the present invention to further develop a hydraulic brake system of the type described above such as to achieve limitation of the acceleration slip down to uncritical values by means of structurally simple measures.

SUMMARY OF THE INVENTION

According to this invention this object is achieved in that the wheel brakes associated with the driven wheels communicate with an auxiliary pressure source by way of a normally locking connecting valve controllable by the slip control electronics. The result of such an embodiment will be that, when critical slip values of the automotive vehicle will be reached during starting, the slip control electronics will cause the connecting valve to adopt an open position, thus the wheel brakes of the driven vehicle wheels being pressurized without an actuation of the braking pressure genertor until the acceleration slip will have dropped to uncritical values. If a hydraulic power booster with a master cylinder connected downstream thereof is used as braking pressure generator then preferably the wheel brakes of the rear axle of the automotive vehicle will be connected at the pressure chamber of the hydraulic power booster, said rear axle usually transmitting the engine power to the road surface. The inventive idea, however, may also be applied to those brake systems where the front wheels of the automotive vehicle are driven the wheel brakes of which are connected at the master cylinder. Moreover, the inventive idea is also applicable to vehicles with all-wheel drive.

In a further embodiment of this invention an outlet of the braking pressure generator will be locked hydraulically upon the actuation of the connecting valve. If the present invention is used in brake systems where one vehicle axle is exclusively driven it will be necessary to keep the pressure of the auxiliary pressure source off the braking pressure generator after the switching-over of the connecting valve. If, for example, a hydraulic power booster with a master cylinder connected downstream thereof is used as braking pressure generator the consequence of the switching-over of the connecting valve without a locking device at the outlet of the hydraulic power booster will be that pressure medium of the auxiliary pressure source will enter the pressure chamber of the hydraulic power booster and unintentionally pressurize respectively the working chamber of the master cylinder and the wheel brakes connected to the working chamber. Expediently, an electromagnetically operable 2/2-way valve is used as connecting valve, the electromagnetically operable 2/2-way valve being controllable by slip control electronics like the other solenoid valves. In the simplest case a non-return valve is connected at the outlet of the braking pressure generator, with the non-return valve locking towards the braking pressure generator. Upon switching-over of the connecting valve, said non-return valve will prevent pressure medium from being supplied to the braking pressure generator. However, upon a normal braking action, the pressure medium supplied to the wheel brakes will be returned to a supply reservoir via the drain valves connected at the wheel brakes. On the other hand, it will be advantageous if an electromagnetically operable 2/2-way valve is connected at the outlet of the braking pressure generator, with the valve switching over simultaneously with the connecting valve or shortly before the connecting valve. In the case of normal braking actions, the pressure reduction will be effected conventionally by returning pressure medium from the wheel brakes to the braking pressure generator. An advantageous embodiment of the present invention provides that the connecting valve and the valve at the outlet of the braking pressure generator are integrated in one valve and have a common drive.

The inventive idea will preferably be used in those brake systems where a hydraulic power booster with a master cylinder connected downstream thereof is used as braking pressure generator, at the pressure chamber of the hydraulic power booster a brake circuit being connected which leads to wheel brakes of driven vehicle wheels. Brake systems have such braking pressure generators are preferably rated so as to to have the wheel brakes, which are connected to the pressure chamber of the hydraulic power booster, arranged at the rear axle of the automotive vehicle.

In an advantageous further embodiment of the present invention it is provided that upstream of the wheel brakes associated with the driven vehicle wheels normally open check valves are connected which are controllable by the slip control electronics. In such an embodiment the acceleration slip of the driven wheels allows to the adjusted in an at least partially individual manner.

BRIEF DESCRIPTION OF THE DRAWING

In the following, this invention will be explained in more detail, reference being made to FIGS. 1 and 2 of the drawing, wherein.

Parts corresponding to one another have been assigned the like reference numerals.

DETAILED DESCRIPTION

Figure 1:
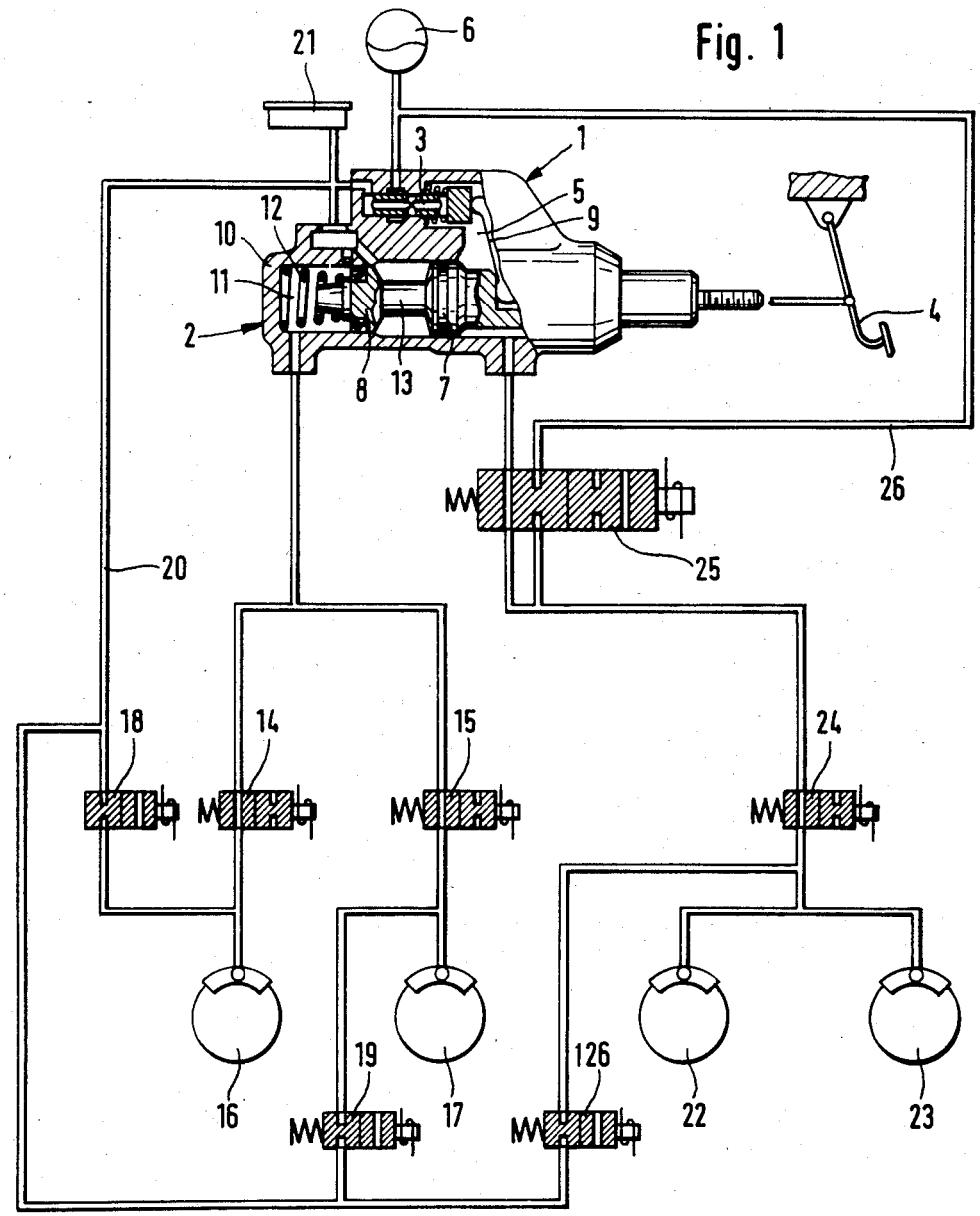
FIG. 1 is the representation on principle of a brake system with acceleration slip control.
Figure 2:
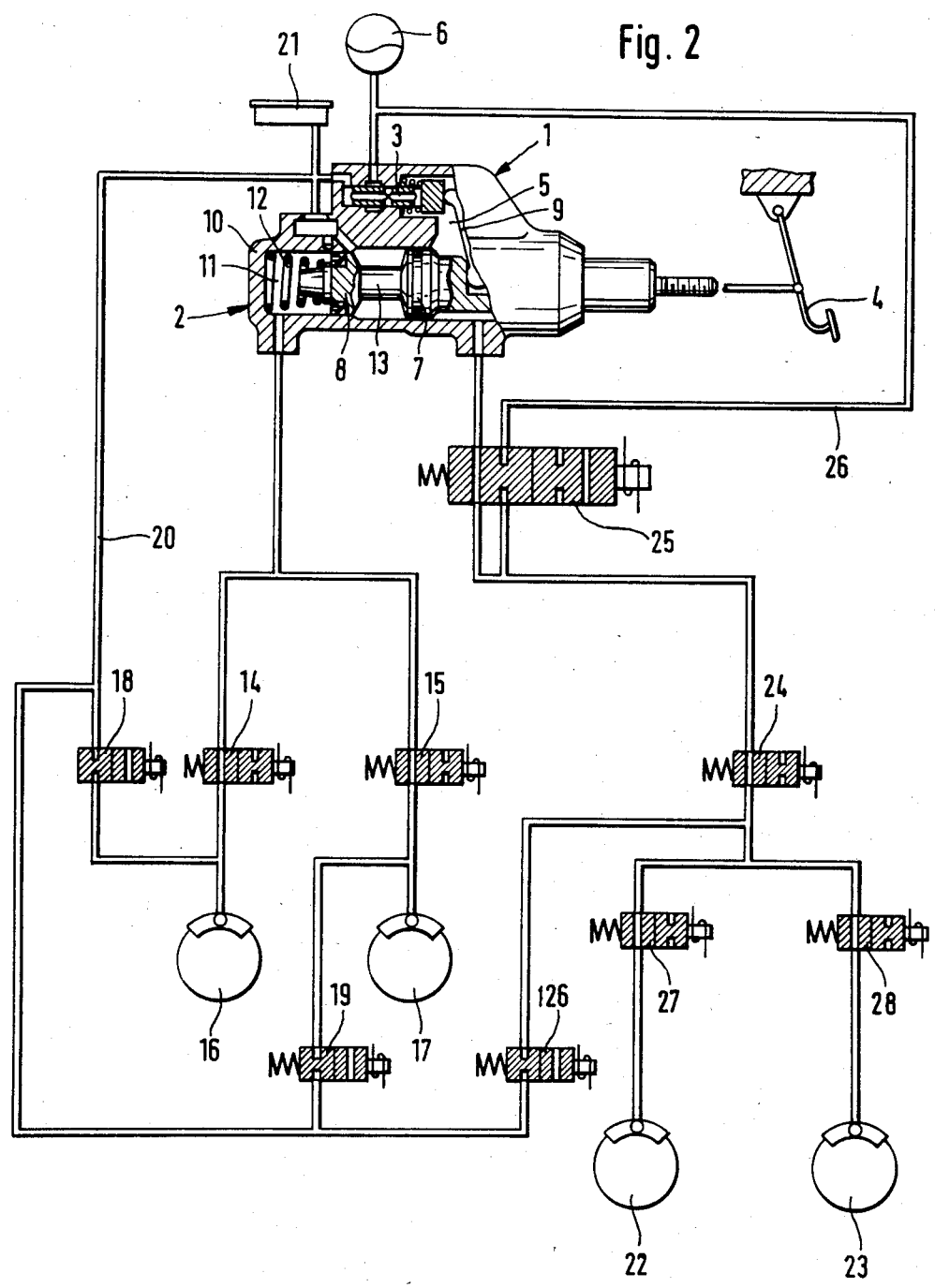
FIG. 2 is a brake system in which the acceleration slip of the driven wheels is individually controllable.

In FIG. 2, a hydraulic power booster is marked 1, a master cylinder 2 being connected downstream of said hydraulic power booster 1. The hydraulic power booster 1 has a brake valve 3 by means of which, in dependence on the actuating travel predetermined by the brake pedal 4, a hydraulic pressure may be modulated in a pressure chamber 5. In the example of an embodiment represented in FIG. 1 the brake valve 3 is designed as sliding valve arranged in parallel with the axis of a booster piston 7 and of a master cylinder piston 8. Connected to the brake valve 3 is a hydropneumatic pressure accumulator 6 preferably charged by a non-illustrated pressure medium pump. The operational condition of the pressure medium pump is controlled by a likewise non-illustrated pressure switch permanently monitoring the charge of the pressure accumulator 6 and releasing corresponding control signals to the pressure medium pump. The brake valve 3 is operable via a lever mechanism 9 partially discernible from the drawing.

The housing 10 and the master cylinder piston 8 of the master cylinder 2 confine a working chamber 11 wherein a compression spring 12 is arranged which resiliently prestresses the master cylinder piston 8 and the booster piston 7 in the brake's release direction. The master cylinder piston 8 is rigidly connectd with the booster piston 7 via a tappet 13 of smaller diameter.

Wheel brakes 16, 17 are connected to the working chamber 11 via electromagnetically operable valves 14, 15. Said wheel brakes 16, 17 are preferably arranged at the front axle of an automotive vehicle. The solenoid valves 14, 15 are controllable by non-represented slip control electronics. When de-energized, said valves 14, 15 will adopt a position in which a free passage will be established between the inlet and the outlet. Suitable control signals of the slip control electronics will switch the solenoid valves 14, 15 into a second position in which a hydraulic passage will be interrupted between the inlet and the outlet. Further, electromagnetically operable valves 18, 19 are connected at the wheel brakes 16, 17. Said valves 18, 19 are likewise controllable by the slip control electronics and normally adopt a locking position. The solenoid valves 18, 19 being correspondingly actuated, the wheel brakes 16, 17 may be connected with a pressure line 20 connected with an unpressurized reservoir 21.

Connected at the pressure chamber 5 of the hydraulic power booster 1 are two further wheel brakes 22, 23 preferably arranged at the rear axle of the automotive vehicle. Connected upstream of the wheel brakes 22, 23 is a common solenoid valve 24 which, like the solenoid valves 14, 15 is controllable by the slip control electronics and which normally adopts an open position. With the solenoid valve 24 excited, a hydraulic connection will be interrupted between the pressure chamber 5 of the hydraulic power booster 1 and the wheel brakes 22, 23. Further, between the solenoid valve 24 and the pressure chamber 5 of the hydraulic power booster, a connecting valve 25 is arranged which, like all the other solenoid valves, is controllable by the non-represented slip control electronics. The connecting valve 25 is communicating with the pressure accumulator 6 via a pressure line 26. In the connecting valve's rest position illustrated in the drawing a connection is interrupted between the pressure accumulator 6 and the solenoid valve 24. In the second position of the connecting valve 25, the pressure chamber 5 of the hydraulic power booster is locked relative to the wheel brakes 22, 23 while the pressure line 26 leading to the solenoid valve 24 is open.

In the following, the mode of operation of the described brake system will be explained in more detail, proceeding from the brake's release position in which all components of the brake system will have adopted the positions discernible from the drawing. An actuating force being applied to the brake pedal 4 for the purpose of a braking action, the brake valve 3 of the hydraulic power booster 1 will come into an axial position in which a more or less throttled passage will be established between the pressure accumulator 6 and the pressure chamber 5 of the hydraulic power booster 1. Consequently, a pressure will be built up in the pressure chamber 5 of the hydraulic power booster. Said pressure will directly propagate to the wheel brakes 22, 23 of the automotive vehicle via the open connecting valve 25 and the solenoid valve 24. Further, the pressure built up in the pressure chamber 5 of the hydraulic power booster will pressurize the booster piston 7 which thus will start moving in the direction of actuation after a certain pressure level will have been exceeded in the pressure chamber 5. Thereby, via the tappet 13, the booster piston 7 will displace the master cylinder piston 8 in the direction of actuation. The consequence of such a displacement of the master cylinder piston 8 will be that in the working chamber 11 of the master cylinder 2 a static pressure will build up which will be supplied to the wheel brakes 16, 17 at the front axle of the automotive vehicle, the solenoid valves 14, 15 being in an open position.

If there occurs a critical brake slip at one or several vehicle wheel(s) associated with the wheel brakes 16, 17, 22, 23, in dependence on the control signals of the slip control electronics, at first corresponding control signals will be released to the solenoid valves 14, 15, 24, which will be switched into a locking position so as to keep the pressure constant in the wheel brakes 16, 17, 22, 23. Should such an action of keeping the effective braking pressure constant not be sufficient to cause a reacceleration of the respective vehicle wheel(s) then the slip control electronics would correspondingly actuate the solenoid valves 18, 19, 126. Thus, if required, the effective braking pressure in the wheel brakes 16, 17, 22, 23 may be reduced. This will bring about a reacceleration of the vehicle wheel affected by critical brake slip values.

When operating an automotive vehicle, besides critical brake slip values, there also may occur critical acceleration slip values usually indicated to the driver by a spinning of the driven vehicle axle. In FIG. 1, it is assumed that the wheel brakes 22, 23 are arranged at a driven vehicle axle of the automotive vehicle. During the start of the automotive vehicle, in particular in case of small coefficients of friction of the road surface, there may occur the case that the vehicle wheels associated with the wheel brakes 22, 23 come into the range of unfavorable acceleration slip values. This, on the one hand, will prevent the acceleration values achievable from being achieved. On the other hand, the lateral traction of the automotive vehicle will be lost in case of a rear-axle-driven automotive vehicle.

If the slip control electronics, not represented in FIG. 1, detect critical acceleration slip values at one or both of the vehicle wheels associated with the wheel brakes 22, 23, said slip control electronics will release a corresponding control signal to the connecting valve 25 whereby the pressure chamber 5 of the hydraulic power booster 1 at first will be separated hydraulically from the wheel brakes 22, 23. At the same time, the outlet of the pressure accumulator 6 will be connected with the wheel brakes 22, 23 via the connecting valve 25 and via the solenoid valve 24 which is in the open position. Thus a braking force will become effective at the wheel brakes 22, 23 without any force acting on the brake pedal 4. Said braking force will counteract the driving force and ensure that the acceleration slip will be reduced. The slip control electronics controlling the start is preferably rated such as to ensure that also the solenoid valves 24, 126 are actuatable so that, on the one hand, during the start the effective braking force may be kept constant in the wheel brakes 22, 23 by a switching-over of the solenoid valve 24 while, on the other hand, the braking pressure may be reduced by an actuation of the solenoid valve 126. The non-represented slip control electronics detecting that the acceleration slip values have reached an uncritical range, the connecting valve 25 will be switched back after a reduction of the braking pressure in the wheel brakes 22, 23 via the solenoid valve 126, thus the brake system's position discernible from the drawing being reestablished.

The example of an embodiment represented in FIG. 2 differs from the brake system represented in FIG. 1 only in that additional solenoid valves 27, 28 are connected upstream of the wheel brakes 22, 23 arranged at the driven vehicle axle. Said solenoid valves 27, 28 normally are in an open position and may be switched into a locking position by the slip control electronics, in said locking position the effective braking pressure being kept constant in the wheel brakes 22, 23. It now be assumed that the vehicle wheel associated with the wheel brake 22 will reach critical slip values during a start while the vehicle wheel associated with the wheel brake 23 will transmit the driven power with favorable slip values to the road surface. In such an operating condition the solenoid valve 28 will be caused by the slip control electronics to adopt a locking position while the solenoid valve 27 will remain in its rest position in which a further build-up of the effective braking pressure may take place in the wheel brake 22. The control electronics not described in detail are able to actuate the solenoid valves 24, 126, 27, 28 independently of each other. Thus, during the described start with critical acceleration slip values at the vehicle wheel associated with the wheel brake 22 it will also be possible to reduce the start braking pressure in the wheel brake 22 via the solenoid valve 126 after the solenoid valve 24 will have been switched into a locking position.

Finally, is pointed out that the connecting valve 25 also may be connected downstream of the working chamber 11 of the master cylinder 2 in case of an automotive vehicle where the wheel brakes 16, 17 are arranged at the driven axle. Moreover, the basic idea of this invention may also be realized in all-wheel-driven automotive vehicles. In automotive vehicles with such a drive, however, two connecting valves 25 will be required.

What is claimed is:

1. A hydraulic brake system with slip control for automotive vehicles comprising:
    a plurality of wheel brakes operating on a like plurality of wheels, at least one wheel being driven;
    a pedal-operable braking pressure generator having a first piston defining a first chamber and a second piston defining a second chamber;
    an unpressurized reservoir;
    a pressure accumulator hydraulically connected to said first chamber by a brake valve;
    a first brake system valve means normally connecting at least one of said brake wheels with said second chamber;
    a second brake system valve means normally connecting said driven wheel brakes with said first chamber;
    a third brake system valve means normally interrupting flow between said wheel brakes and said unpressurized reservoir;
    a fourth brake system valve means normally interrupting flow between said driven wheel brakes and said pressure accumulator; whereby said slip control closes at least one of said first and second brake system valve means in response to a first predetermined input control signal; and whereby said slip control closes at least one of said first and second valve means and opens said third valve means in response to a second predetermined input control signal; and whereby said slip control opens said fourth valve means in response to a third predetermined input control signal.

2. The hydraulic brake system as claimed in claim 1 wherein said fourth valve means also disconnects said driven wheel brakes from said first chamber in response to said third predetermined input control signal.

3. The hydraulic brake system as claimed in claim 2 including a one-way valve included hydraulically between said second chamber and said wheel brakes connected thereto.

4. The hydraulic brake system as claimed in claim 1 wherein each said valve means is an electromagnetically operable hydraulic valve.

5. The hydraulic brake system as claimed in claim 1 wherein said pressure generator is provided by a master cylinder having a booster chamber and a working chamber, said first chamber provided by said booster chamber and said second chamber provided by said working chamber.

* * * * *